United States Patent [19]

Alston et al.

[11] 3,761,618

[45] Sept. 25, 1973

[54] TRAFFIC USAGE ENCODER

[75] Inventors: Russell M. Alston, West Covina; John R. Watson, Glendora; James E. Westbrook, Covina, all of Calif.

[73] Assignee: Conrac Corporation, New York, N.Y.

[22] Filed: July 26, 1972

[21] Appl. No.: 275,207

[52] U.S. Cl. .................................................. 179/8 A
[51] Int. Cl. .......................................... H04m 15/26
[58] Field of Search ..................... 179/8 A, 8 R, 7 R

[56] References Cited

UNITED STATES PATENTS

| | | | |
|---|---|---|---|
| 3,115,549 | 12/1963 | Lamneck et al. | 179/8 A |
| 3,099,819 | 7/1963 | Barnes | 179/8 A |

*Primary Examiner*—Kathleen H. Claffy
*Assistant Examiner*—Kenneth D. Baugh
*Attorney*—Charlton M. Lewis

[57] ABSTRACT

Electronic encoding of detailed traffic usage information for up to 28,800 distinct communication lines is accomplished economically by utilizing the line scanning capability of existing electromechanical Traffic Usage Recorders (TUR). A relatively small number of digital signals, typically 32, are extracted from selected points of each electromechanical TUR "frame" and are processed electronically. That processing typically includes time adjustment of 24 position signals to eliminate overlapping within each of three groups, conversion of each group to binary coded decimal form, and differential time gating of those position signals relative to six detector signals, all performed by separate circuitry for each TUR frame. The resulting time adjusted signals from all TUR frames are then supplied on a time sharing basis to common circuitry which typically converts the position signals from BCD to binary code, separately stores each signal group, and finally converts the stored signals to serial code for delivery to any desired data processing center. The system typically includes provision for increasing circuit reliability, as by checksum computation for the detector signals and production of a parity bit for each serial word as finally delivered. Further information of arbitrary type can be inserted, for example as additional bits in each word or additional words following each scan cycle.

8 Claims, 7 Drawing Figures

FIG. 5, FIG. 6

TRAFFIC USAGE ENCODER

FIELD OF THE INVENTION

This invention has to do generally with systems for detecting and recording the degree of usage of communication lines. Telephone companies depend upon such traffic usage recorders for many purposes, such as planning expansion and redesign of equipment.

DESCRIPTION OF THE PRIOR ART

Prior art systems for providing traffic usage information have included, in particular, two types of systems. Systems of one type, widely used in the telephone industry and known as Traffic Usage Recorders (TUR), utilize electromechanical switching equipment for period-ically scanning in sequence a large number of input lines from specific telephone or other communication lines. Output information is obtained from electromechanical registers which cumulate the numbers of busy circuits that are found during a particular scanning period. It has been impractical in such TUR systems to indicate the usage of each individual communication line. The common practice is to group together certain fields of lines, and to provide only sufficient registers to indicate the numbers of busy conditions detected for the various line groups. TUR equipment is manufactured by Western Electric Company and is described more fully in publications by that company and by American Telephone & Telegraph Company, such as Bell Telephone Laboratories publications SD95738, T95738, and CD95738.

A second and more recent type of prior art system has been designed primarily to provide more complete information with regard to the usage of individual lines. Systems of that second type include electronic circuits for periodically scanning the input lines and for delivering to a general purpose computer detailed information concerning the observed usage of each line. An advantage of such systems is that the computer can readily be programmed in known manner to produce line usage information at any desired level of detail. Thus, the computer can be programmed, if desired, to produce only information equivalent to the group usage of definite fields of lines, which was previously available from the conventional TUR systems; or to tabulate usage of each individual line; or any desired specific level and format of information between those extremes.

Whereas systems of the second type are generally more satisfactory than the original TUR systems, primarily because they are capable of providing more complete and detailed output information, they are more expensive. Even for users who already have available suitable general purpose computers that are not fully committed to other programs, such electronic systems require relatively elaborate and costly electronic equipment for providing the necessary scanning functions.

SUMMARY OF THE INVENTION

A primary object of the present invention is to produce an effective and economical system for indicating traffic use.

A more particular object of the invention is to combine in a single system that detailed capability of the previous electronic systems without sacrificing the relative economy and simplicity of the well-known electromechanical systems.

The invention attains those primary objectives by utilizing already existing electromechanical TUR systems for performing the required line scanning function. Selected information is extracted from suitable points of the TUR equipment over a relatively small number of channels. That information is processed electronically to produce, each time a communication line is sampled, a code word containing full information about that sampling, including in particular a suitable code identification of the sampled line and its busy or idle condition. That coded information is preferably converted to serially coded digital form which can be transmitted to a remote location if desired and utilized efficiently by a general purpose data processing center. The information supplied to the data processing center typically comprises a series of 24-bit words, each identifying a group of six individual lines which are scanned simultaneously by the TUR equipment, together with the busy condition of each line and other information to be described.

A typical encoder in accordance with the present invention can handle information gathered from up to eight TUR frames, each of which is designed to service 3,600 individual communication lines. Moreover, extraction of the required information from the electromechanical TUR frames is carried out in such a way that it does not interfere with normal conventional operation of that equipment. Thus the normal TUR output information may, for example, be used locally for conventional control purposes, while the more elaborate and detailed information made available by the present invention is transmitted for processing in any desired manner typically at a central computer capability.

The present invention makes use of the line scanning capability of a conventional Traffic Usage Recorder (TUR) of the type employing electromechanical crossbar scan switches. Each such switch typically comprises a grid of ten horizontal and ten vertical crossbars with switch contacts mounted at the 100 crossbar intersections. The terms "horizontal" and "vertical" as used herein are intended for convenient identification of the two crossbar sets and do not imply any necessary limitation upon the actual crossbar orientation. The individual crossbars are operated by respective electromagnets in such a way that the switch contacts at any particular crossbar intersection or crosspoint are closed only in response to simultaneous energization of the corresponding horizontal and vertical crossbar magnets. As commonly used, such crossbar switches are provided with six sets of switch contacts at each crosspoint, those six contact sets or contact levels being electrically independent but all closed simultaneously. Each crossbar switch of the type described thus includes 600 distinct sets of switch contacts.

Determination of the idle or busy condition of a telephone circuit can be made by connecting a single lead from that circuit to a suitable busy condition detector. Hence each crossbar switch of the type described can handle inputs from 600 telephone circuits. Since the six contact sets at each crosspoint are closed simultaneously, separate detectors are provided for those respective contact sets or switch levels. Each detector is typically connected in multiple to the contact sets of like level at all 100 crosspoints of the switch. The six detector outputs then contain full information as to the busy condition of the six input lines corresponding to the six contacts that are closed in unison at any one point of the scan. However, those six detector outputs do not, in themselves, give any indication as to which of the switch crosspoints is being scanned.

That information is supplied in economical manner in the conventional TUR equipment by providing a second crossbar switch, referred to as a register switch, which is typically identical to the scanning switch and is operated in synchronism with it by the same driving pulses. The six detector output lines are connected in multiple as inputs to all 100 contact sets of corresponding level in the register switch. The 600 output lines from the register switch then correspond uniquely to the 600 input telephone lines, and each carries a busy signal only if its input line is busy at the moment it is reached in scan. Hence the output lines from the register switch carry full usage information on the 600 telephone lines connected as input to the scanning switch.

However, those 600 output lines from the register switch do not comprise a suitable source of data for supply to a data processing unit. For one thing, the number of electrical connections required would not represent any simplification as compared to direct connection to the communication lines themselves. Moreover, it is the usual practice to construct TUR equipment in units considerably larger than those described above. More particularly, each "frame" of such equipment typically comprises six pairs of scanning and register switches such as have been described, together with six "switch relays" and control means for operating the relays in sequence to supply the crossbar operating pulses to the crossbar magnets of the respective switch pairs in sequence. Each "frame" of TUR equipment thus tests in sequence a total of 3,600 telephone lines and each of the 3,600 output lines from the six register switches carries a busy signal whenever the corresponding telephone line is busy at the moment of scanning. Thus connection of electronic data processing equipment to the actual TUR output lines would require 3,600 connections for each TUR frame, with corresponding increase of complexity with increase in the number of frames to be served.

The present invention avoids that difficulty, while making available to a data processing center full details of the data present on the 3,600 output lines of each TUR frame. That is accomplished by providing a special encoding system which typically requires only 32 input connections from each TUR frame, and which can then transmit all of its output data to a data processing center over a single line. The invention is thus well adapted for use with a remote data processing center.

Moreover, in preferred form of the invention each encoding system is capable of handling all data from as many as eight frames of TUR equipment, each frame receiving inputs from 3,600 communication lines. Such enlarged capability of the encoder typically requires 32 input lines from each frame of the TUR equipment, but can still deliver all usage data, covering up to 28,800 communication lines, over a single line to the data processing center.

BRIEF DESCRIPTION OF THE DRAWING

A full understanding of the invention, and of its further objects and advantages, will be had from the following description of a preferred manner of carrying it out. That description is to be read with reference to the accompanying drawings, in which.

DESCRIPTION OF THE PREFERRED EMBODIMENT

Figure 1:
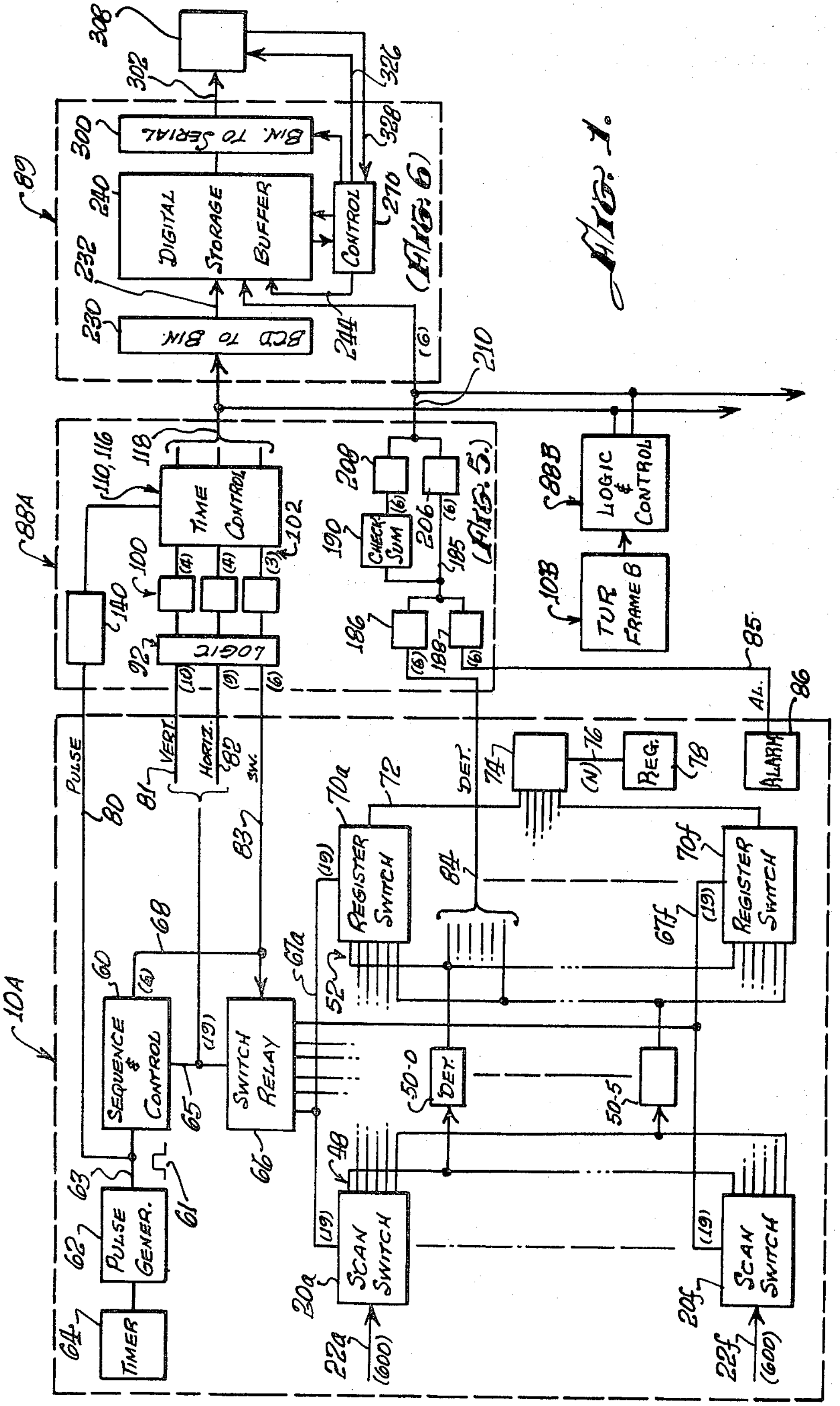
FIG. 1 is a block diagram representing schematically a conventional TUR frame and the primary components of an illustrative embodiment of the present invention.

Block Diagram of FIG. 1

Conventional Traffic Usage Recorder

Figure 2:
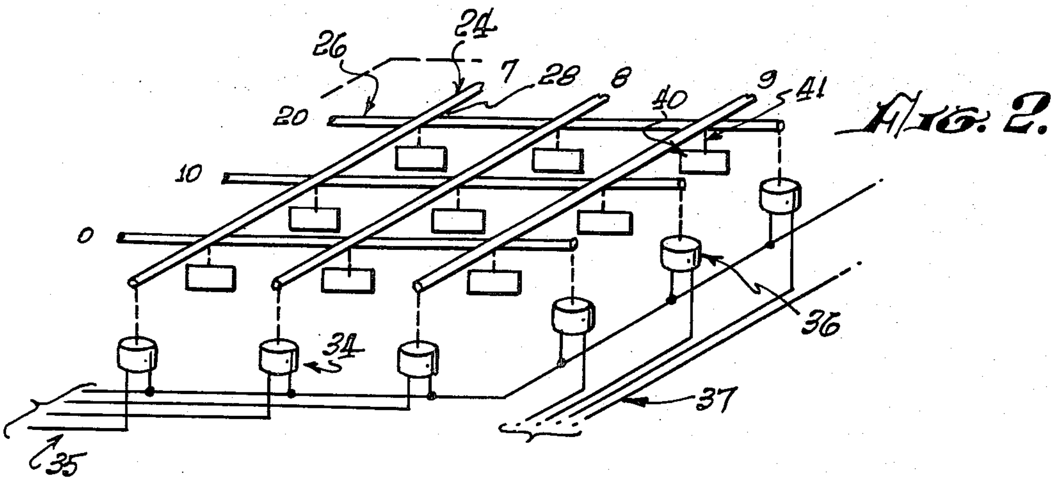
FIG. 2 is a schematic fragmentary perspective representing in principle a conventional crossbar switch.

FIG. 1 represents in block form the conventional type of Traffic Usage Recorder (TUR) that may be utilized by the present invention. The single TUR unit or "frame" illustrated at 10A comprises the six scanning switches 20*a* to 20*f* and the six register switches 70*a* to 70*f*. Each of those switches is of crossbar type, comprising ten so-called vertical crossbars 24 and ten horizontal crossbars 26, as shown schematically for a typical scanning switch in FIG. 2. The vertical and horizontal crossbars cross at 100 crosspoints 28, at each of which a switch contact assembly 40 is mechanically coupled to the crossbars, as indicated by the dashed lines 41.

Figure 3:
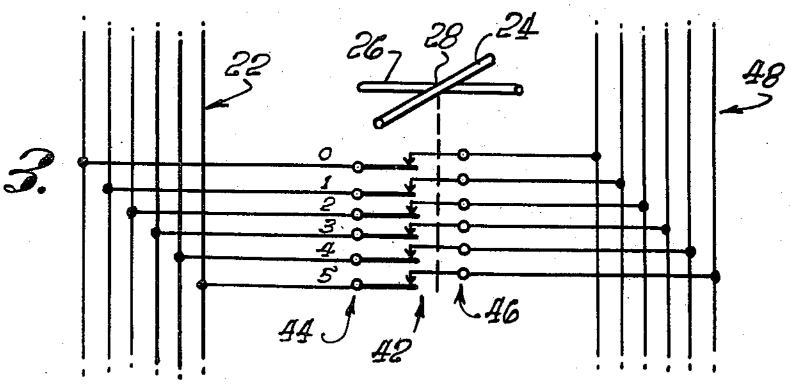
FIG. 3 is a schematic diagram representing a contact assembly of a conventional crossbar switch.

As shown schematically in FIG. 3, each contact assembly 40 comprises six levels 0 to 5 of electrically independent sets of switch contacts 42 with input terminals 44 and output terminals 46. Simultaneous operation of one vertical and one horizontal crossbar selects a particular crosspoint, simultaneous closing all six contact sets of the associated assembly 40. The input lines 22 from the individual communication circuits to be tested are connected to the respective input terminals 44 of the switch contact sets 42. Each of the scanning switches, such as 20*a*, thus accommodates 600 distinct input lines 22*a*, each line carrying a signal that represents the busy or idle condition of the corresponding communication circuit. A number in parentheses associated with a circuit line throughout the present drawings, as (600), indicates the actual number of parallel wires typically represented by that line.

The vertical and horizontal crossbars 24 and 26 are driven by the respective vertical magnets 34 and horizontal magnets 36 in response to operating pulses supplied over the respective lines 35 and 37 to one terminal of each magnet. The scanning and register switches of each pair are typically identical in construction and operation, and are operated simultaneously, as by delivering the crossbar operating pulses to the corresponding magnets of both switches in series. In practice, each circuit 35 and 37 includes in series a pair of corresponding magnets in the scanning and register switches of a switch pair. All those circuits are connected at one end to a common source of direct current, and are pulsed by individually grounding the other ends of the circuits in such sequence that 100 crosspoints are scanned in definite and identical order in both crossbar switches.

That order typically involves scanning first through the ten vertical crossbars while the 0 horizontal crossbar is held operated, then scanning the vertical crossbars again while the 1 horizontal crossbar is operated, and so on to the 9 horizontal crossbar. That scanning mode provides a convenient basis for numbering the 100 input lines connected to the input terminals 44 for a particular level. Thus, the vertical crossbars are commonly referred to as Units crossbars and denoted by the numbers 0 to 9, while the horizontal crossbars are referred to as Tens crossbars and denoted by the numbers 00 to 90. The six successive levels of switch contacts 42 then correspond to respective Hundreds, denoted 000 to 500.

Crossbar driving pulses in the correct sequence and duration to produce the described scanning action are developed in known manner by the sequencing and control circuitry indicated schematically at 60 in FIG. 1. That circuitry operates under time control of the periodic timing pulses 61 supplied on the line 63 from the pulse generator 62. Pulse Generator 62 is typically essentially a free-running oscillator of frequency approximating 6.8 cycles per second, each timing pulse having a duration of about 50 ms. The pulse generator is set in operation by the timing device 64 to initiate scanning cycles at predetermined time intervals.

The electromechanical pulse generating mechanism 60 is such that successive pulses of the same type occasionally overlap in time. However, simultaneous operation of more than one crossbar of the same type is prevented by a mechanical interlock between adjacent crossbars. That interlock has been found to delay operation of one crossbar until the preceding one has been released by its magnet, so that the period of actual operation of each crossbar does not start at the leading edge of its driving pulse, but at the trailing edge of the pulse of the preceding crossbar.

Moreover, the horizontal crossbar structure is such that no specific control signal is required for operating the 00 horizontal crossbar, since it is mechanically operated whenever the other nine horizontal crossbars are all unoperated. Hence sequencing circuit 60 develops ten distinct vertical crossbar operating pulses, but only nine horizontal crossbar operating pulses. Thus, only 19 distinct wires are required at lines 65, as indicated in FIG. 1 by the numeral (19).

The crossbar driving pulses are delivered from sequencing circuit 60 via the respective lines 65 to the switch selection relay 66, which has six sets of output lines 67*a* to 67*f* corresponding to the six switch pairs 20a to 20f and 70*a* to 70*f*. Relay 66 delivers the pulses to one of those switch pairs continuously throughout a single complete scan of the 100 crosspoints, and then automatically shifts the pulses to the next switch pair. A complete cycle of scanning action thus covers all 3600 input lines 22*a* to 22*f*. That action of relay 66 is controlled by switch selection signals received via the six lines 68 from sequencing circuit 60, where they are developed under joint control of the timing pulses from 62 and the crossbar driving pulse mechanism. Although successive switch selection signals may overlap in time, simultaneous operation of two switches is prevented by relay interlock mechanism similar in function to that already described for the crossbars.

Each complete frame scan of the 3,600 input lines, performed six lines at a time, requires somewhat more than 600 timing pulses from generator 62. That is because, after each sequential operation of the ten vertical crossbars in response to ten successive timing pulses, the next timing pulse is employed by the pulse generating mechanism for shifting from one horizontal crossbar to the next. Hence that timing pulse does not produce any closure of switch contacts, and a total of 660 timing pulses are typically required for each complete frame scan, which typically occupies about 96 seconds. Following such a complete scan, the generation of timing pulses at 62 is normally terminated until another scan is initiated either by sequencing circuitry 60 at a regular 100-second periodicity, or by timing mechanism 64 at the next set time.

Referring again to FIG. 3, the output terminals 46 from the six levels of contact sets 42 are connected via the lines 48 to respective busy detectors 50. The function of each busy detector is to distinguish the busy or idle condition of the communication line to which its input is momentarily connected via one of the scanning switches, and to develop a suitable busy signal at its output whenever a busy condition is detected. All output contacts 46 of the same level for all six scanning crossbar switches are typically multipled together and connected to the input of a single detector 50. There are thus only six detectors for each complete TUR frame, each detector serving all 600 communication circuits that are connected to a cotact set of given level. The six detectors are designated 50–0 to 50–5 to emphasize that they correspond to respective contact levels 0 to 5, and do not correspond to respective switch pairs, designated *a* to *f*. From the above described scanning action of scanning switches 20*a* to 20*f*, it will be understood that each detector 50–0 to 50– 5 is connected at any one time to only one of the 600 communication lines that it serves.

The proper association of each busy signal from one of the detectors 50 with the correct communication line is provided by the register switches 70*a* to 70*f* by virtue of their operation in synchronism with scanning switches 20*a* to 20*f*. The output from the detector for each contact level is connected in parallel to the 600 input switch contacts of that level in the six register switches 70*a* to 70*f*. Those connections, represented by the lines 52 in FIG. 1, thus correspond symmetrically to detector input lines 48. The 3,600 output contacts of the six register switches are connected to respective individual output lines 72 (FIG. 1), which may be considered to correspond symmetrically and in one-to-one relation to the 3,600 initial input lines 22. Due to the synchronous operation of the scanning and register switches, a busy signal from any one of the six detectors 50–0 to 50–5 is delivered to the particular output line 72 that corresponds to the input line 22 from which the busy signal originated.

In conventional use of the TUR equipment no attempt is made to record separately the busy signals delivered by each of the 3,600 individual output lines 72. Instead, those lines are multipled in groups or fields, typically according to the nature of the communication lines to which they correspond, and only the summed busy signals for the respective groups are registered. The field grouping circuits for the lines 72 are represented in FIG. 1 at 74, with an arbitrary number (N) of output lines 76 leading to respective channels of the register equipment 78. The actual number of fields and the number of registers or register channels may vary considerably in practice, depending upon the nature of the communication circuits being tested and the purposes of the investigation. Many such investigations require more than one TUR frame.

Basic Information Signals

It might be supposed that complete information for supply to data processing equipment could best be derived from either the input lines 22 or the output lines 72 of the TUR equipment, since at those points busy signals are directly identifiable with the particular communication lines that are busy. However, the present encoding system follows a completely different procedure. In contrast to the 3,600 lines that would be required by such a system, the present invention typically obtains full information regarding the condition of all 3,600 communication circuits handled by one TUR frame by extracting from the TUR equipment only 32 signals on an equal number of lines.

Those signals include one signal derived from pulse generator 62 and representing the timing pulse developed by that generator; 19 signals derived from sequence and control circuits 60 and representing the crossbar operating magnet pulses developed by those circuits for supply to the vertical and horizontal crossbar magnets; six signals derived from sequence and control circuits 60 and representing the switch relay control pulses developed by those circuits for control of switch relays 66; and six signals derived from the respective busy condition detectors 50. Each of those signals can be obtained in principle from the terminal within the generating circuitry to which the output line for that signal is connected, or to a terminal farther upstream that carries an equivalent signal. For clarity of illustration in FIG. 1, the required signals are represented as being tapped directly from the output lines from the respective signal generating circuits. Thus, the timing pulse signal is tapped by the line 80 from the pulse generator output line 63; the 19 crossbar magnet pulse signals are tapped from the respective 19 wires 65 by the ten lines 81, carrying vertical crossbar signals and the nine lines 82, carrying horizontal crossbar signals; the six switch signals are tapped by the six lines 83 from the respective lines 68; and the six detector signals are tapped by the six lines 84 from the respective detector output lines 52.

In addition to those signals, the generation of which has been described, the present encoding system can handle, if desired, additional signals conveying further useful information. Such additional signals may be of any desired type, but will be described illustratively as comprising warning signals, which may be generated in known manner and which indicate presence of respective malfunctions of the TUR frame. A conventional source of such alarm signals, typically six in number, is indicated at 86, with respective output lines 85.

Figure 5A:
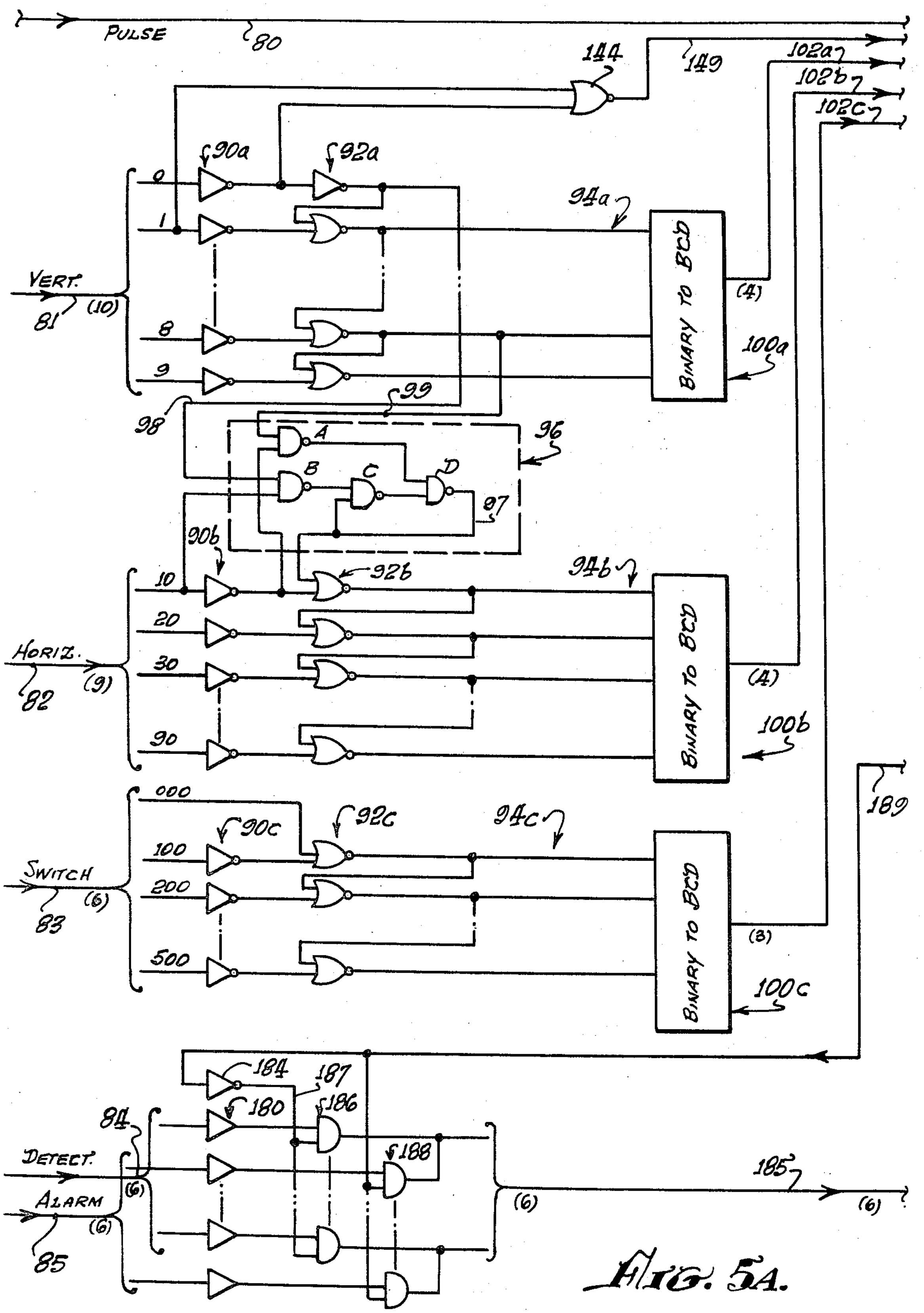
FIG. 5 is a schematic diagram in two sections 5A and 5B representing the logic and control unit of FIG. 1 for receiving signals from a single TUR frame.
Figure 5B:
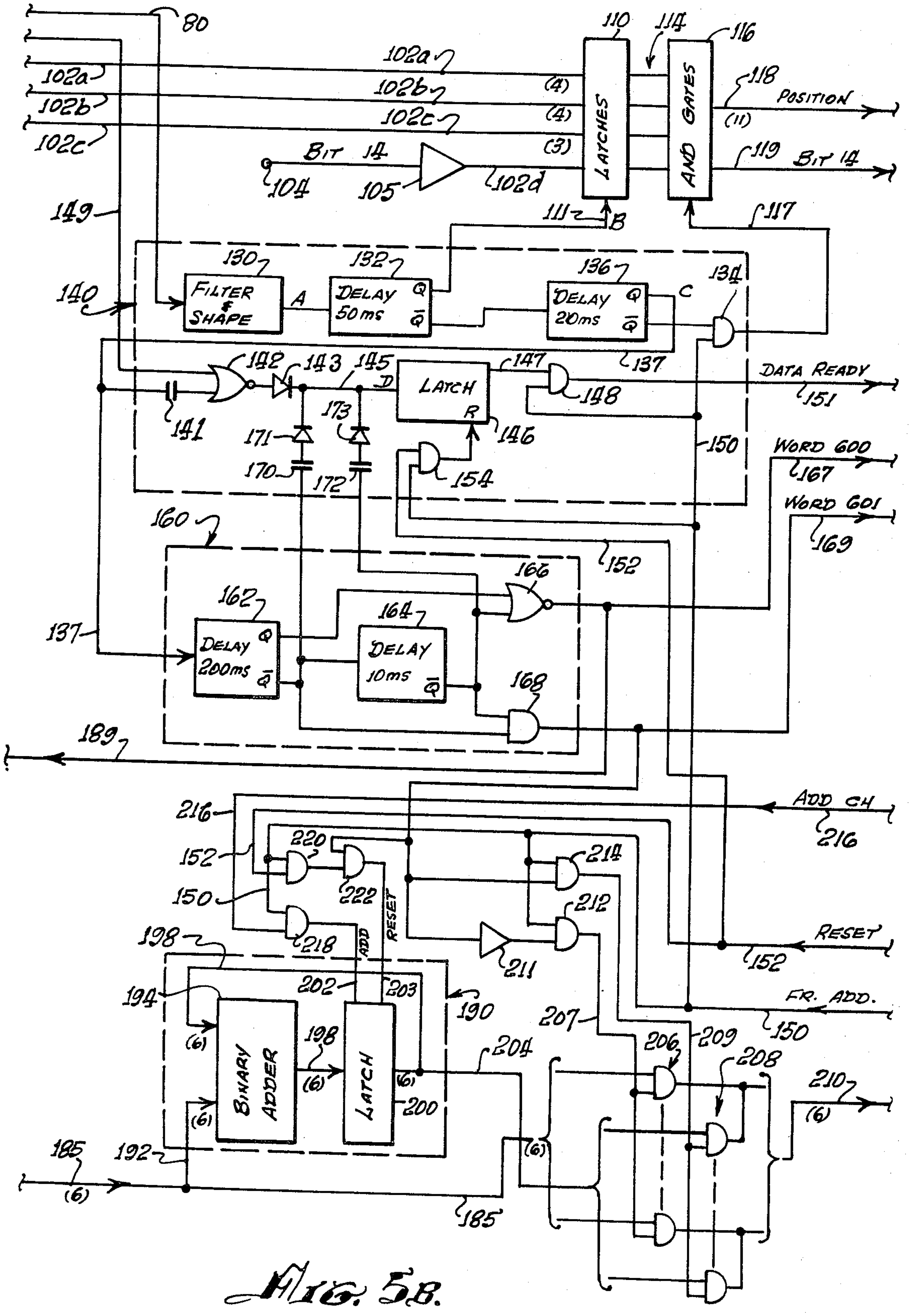

The described signals from TUR frame 10A on lines 80 to 85 are supplied first to the logic and control unit indicated generally at 88A in FIG. 1 and shown more fully in FIG. 5. After initial processing in unit 88A, the resulting information is supplied via the lines 118 and 210 to the encoding unit indicated generally at 89 in FIG. 1 and shown more fully in FIG. 6. If information from more than one TUR frame is to be accommodated, as will be assumed for clarity of description, an additional logic and control unit is provided for each frame, as indicated schematically by the unit 88B serving TUR frame 10B in FIG. 1. The output data signals from all such units 88 on their respective lines 118 and 210 are multipled for supply to a common encoding unit 89. The logic and control unit 88A and encoding unit 89 are shown in FIG. 1 in simplified block form, omitting most control signal connections both within and between those units. Portions of those units are identified in FIG. 1 by numerals which correspond generally, but not always precisely, to the numerals appearing in FIGS. 5 and 6.

Logic and Control Unit

The vertical and horizontal crossbar operating signals on lines 81 and 82 and the switch relay operating signals on lines 83 are first modified by logic circuitry indicated at 92, primarily to eliminate any ambiguity resulting from overlap in time of successive signals of each group. The time-corrected signals of each group are then converted to binary coded decimal (BCD) code in separate encoding networks 100, reducing the numbers of code bits required for representing each signal group, as indicated by the figures in parenthesis on the respective lines 102.

The BCD signals are subjected to further time control in circuitry 110, 116, typically comprising individual latches and gates for the respective signals. The latches and the gates are operated in timed response to respective control signals which are derived in circuitry 140 from the timing pulse received on line 80 from the TUR frame. That gating action is further conditioned by a Frame Address signal, which is supplied from the control circuitry 270 of encoding unit 89 when that unit is ready to process data from the particular TUR frame. Since that Frame Address signal is supplied to only one logic and control unit 88 at a time, the lines 118 receive signals from only one TUR frame at a time.

The six detector signals on lines 84 and the six alarm signals on lines 85 are supplied selectively on a time sharing basis to the lines 185 via the gates 186 and 188. Those gates are controlled by means not explicitly shown in FIG. 1 to pass detector signals throughout each scanning cycle of TUR frame 10A and pass alarm signals only during a short time interval following such cycle. A separate checksum of true signals on each of the six lines 185 is formed in the circuit 190 for each scanning cycle and the following alarm signal period. The gates 206 pass the signals from lines 185 to the lines 210 during each TUR scanning cycle and the following alarm signal period, and the gates 208 pass the checksum code signals from circuit 190 to lines 210 during a following checksum period. However, the gates 206 and 208 are enabled only in presence of the Frame Address signal, already referred to, so that the line 210 receives signals from only one TUR frame at any time.

Encoding Unit

Data reaching encoding unit 89 on lines 118 from any one of the TUR frames is converted from BCD to straight Binary code in the code converter 230. The resulting code signals, together with the data input on lines 210, are then stored in the digital storage buffer 240 in response to control signals from control circuitry 270. Buffer 240 also receives code signals on the lines 244 from control circuitry 270 representing the particular TUR frame that is being addressed, and may receive additional signals if desired. The input signals on lines 210, 232 and 244 and other lines, if any, are stored in parallel as a data word in buffer 240, which preferably has capacity for handling several such words on a first in a first out basis.

Information is retrieved from buffer 240 word by word in parallel and is converted from binary to serial code in code converter 300. The resulting serial code is supplied via the line 302 and suitable interface circuitry to any desired data storage and processing equipment 308, such as a general purpose computer, for example. Release of data from buffer 240 to code converter 300 and line 302 is typically subject to conventional control by the data processing equipment through signals exchanged with control circuitry 270 via the lines 326 and 328.

Logic and Control Unit of FIG. 5

Figure 6:
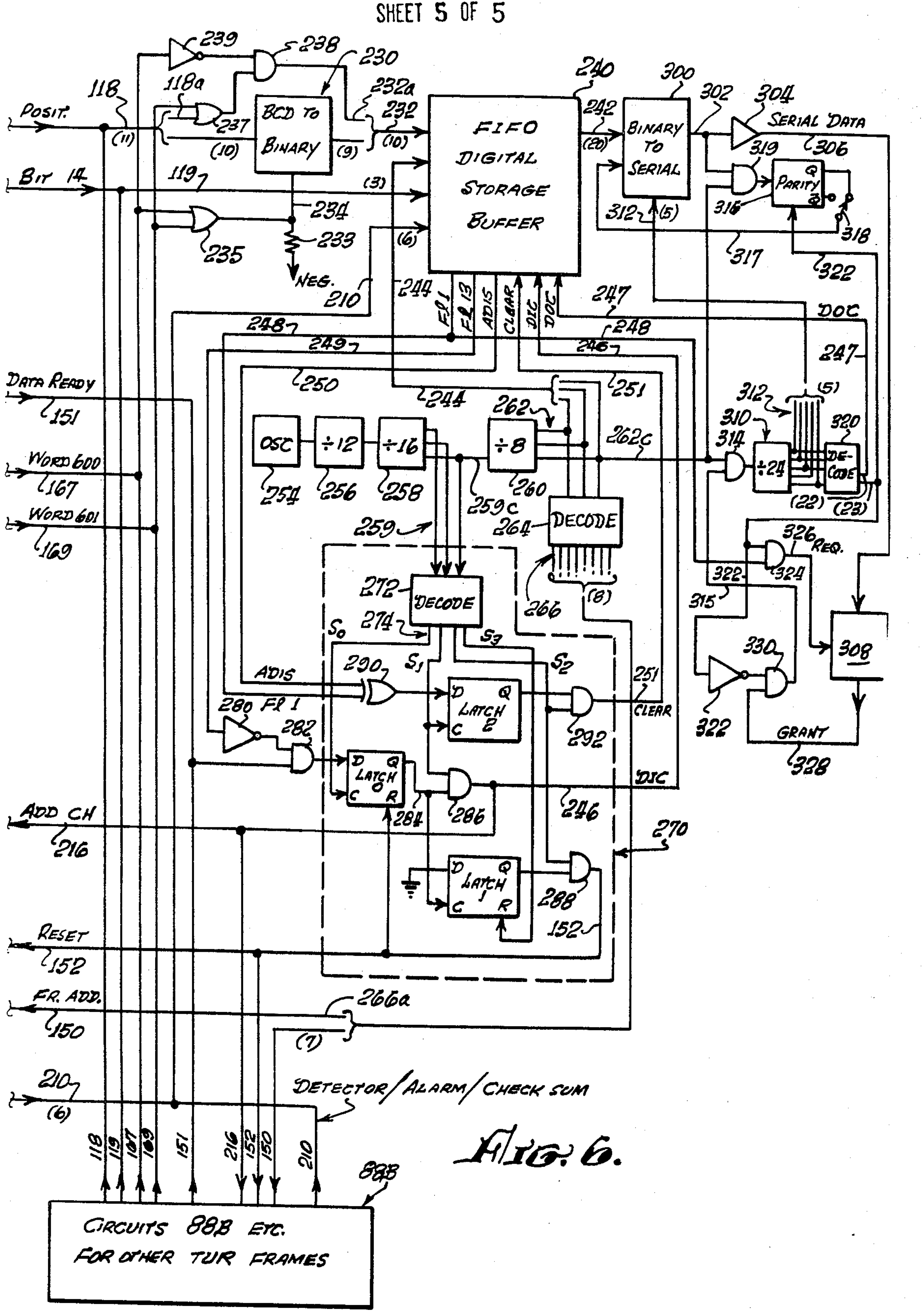
FIG. 6 is a schematic diagram representing the data encoding portion of FIG. 1.

Turning now to more detailed discussion of logic and control unit 88 and of encoding unit 89, with particular reference to FIGS. 5 and 6, those figures are somewhat simplified for clarity of illustration. In particular, circuit connections for conventional supply of power and bias voltages and the like are generally omitted. Signals are generally assumed to be of uniform polarity, with logical 1 represented by a positive-going step or pulse, except as otherwise indicated. However, to make optimum use of integrated circuits that are commonly available, it is convenient to employ inverted signals at least in portions of the system, with appropriate changes of diode polarities, modification of gate circuit types, insertion of inverters, and the like, in accordance with conventional design practice. In all such respects the present description is intended merely as illustration.

Processing Logic

As shown schematically in FIG. 5, the crossbar operating signals are carried by 10 individual lines 81 for vertical signals 0 to 9, and on nine individual lines 82 for horizontal signals 10 to 90, the 00 horizontal signal being absent, as already indicated. The six lines 83 for the six switch operating signals 000 to 500 are also indicated explicitly. All of those 25 signals are individually buffered in the respective inverting buffers 90. The buffered and inverted signals, other than the first signal of each group, are then gated to the lines 94 by the positive NOR gates 92, the second input to each gate being taken from the output of the NOR gate for the preceding signal in each of the three signal groups: vertical, horizontal and switch.

Since the 00 horizontal signal is absent, but is required as input to the NOR gate for the 10 horizontal signal, a synthetic 00 horizontal signal is produced by the illustrative logic circuit indicated at 96 and comprising the four NAND gates A, B, C and D connected as shown. Circuit 96 receives as inputs the 0 and 8 vertical signals on the lines 98 and 99, and both the direct and inverted 10 horizontal signal. The circuit produces on the line 97 a synthetic 00 signal that goes up in response to an 8 vertical signal provided the 10 horizontal signal is down, and is then latched in up condition until the latch is released by presence of the next 0 vertical signal provided the 10 horizontal signal has gone up. A synthetic 00 signal satisfying that logic has been found to produce proper gating of the 10 horizontal signal at its NOR gate 92.

The resulting signals from NOR gates 92 on the respective lines 94 are positive-going binary signals which have been time-corrected for the above described characteristic of the initial TUR control pulses, namely the fact that, although each control pulse is developed and delivered to its magnet or relay coil promptly in response to a timing pulse from generator 62, it does not in general become effective to operate the controlled crossbar or relay until after release of the preceding crossbar or relay at termination of the preceding pulse. NOR gates 92 are illustrative of electronic means for causing the signal pulses to arrive at the respective lines 94 with the leading edge of each signal delayed until termination of the preceding signal of the same group. After that adjustment the signals represent the actual operation of the corresponding crossbar switch contacts and control relays.

Conversion to BCD Code

The three groups of binary signals on lines 94 are converted to three binary coded decimal numbers by the respective converters 100*a*, 100*b* and 100*c*, which typically comprise conventional diode matrices. The first signal in each group is not required by the binary-to-decimal converter, and is omitted. Thus, the 0 vertical signal,the synthetic 00 horizontal signal and the 00 switch signal are all employed only for gating the next following signal of each group. The resulting binary coded decimal signals comprise four signals on the respective lines 102*a* representing the operated vertical crossbar, four signals on the respective lines 102*b* representing the operated horizontal crossbar, and three signals on the respective lines 102*c* representing the crossbar switch being scanned. Those eleven signals will be referred to collectively as "position signals," since they identify a particular switch crosspoint of the TUR frame.

Since the six switch signals supplied to binary-to-decimal converter 100*c* require only three output lines 102*c*, whereas four digits can readily be processed by much of the downstream electronics, it is convenient to provide for insertion of an additional bit of information, which will be referred to as Bit 14 for reasons that will appear. That information is supplied from any desired source 104. After suitable amplification at 105, Bit 14 on the line 102*d* is handled partly, but not entirely, in parallel to the three bits of binary coded decimal information on three-fold lines 102*c* and the other position signals on lines 102*a* and 102*b*.

Signal Timing

The 12 bits of information on lines 102 are temporarily stored by the respective latch circuits indicated collectively at 110, which typically comprise bistable flip-flops controlled simultaneously by clock pulses supplied on the line 111. So long as the clock remains high the signals at the latch output lines 114 follow the data at the respective latch inputs. When the clock goes low the output ceases to respond to the input, but the information that was present at the output at the moment of transition remains available. That information is then gated to the lines 118 and 119 by the respective 12 gating circuits 116 under control of a timing pulse received via the line 117.

The latching and gating signals on lines 111 and 117 are derived from the timing signal received on line 80 from the TUR frame. That timing signal is also used for producing a Data Ready signal for control of the later processing of the data signals. Timing circuitry for both those purposes is indicated generally at 140.

Figure 4:
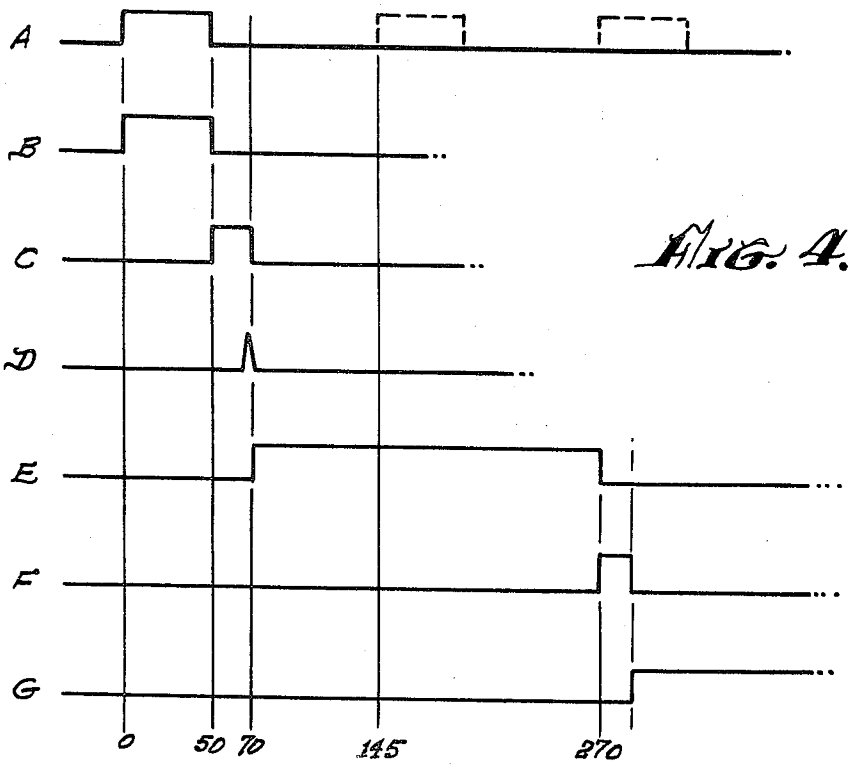
FIG. 4 is a diagram representing certain waveforms of FIG. 5.

The timing signal on line 80 is first filtered and shaped, particularly to sharpen its leading edge, by the conventional circuitry indicated at 130. The resulting sharpened signal A is then supplied to the time delay circuit 132. That circuit, like other time delay circuits to be described, typically comprises a monostable flip-flop, which is set by a positive-going step voltage and returns to its stable condition after a definite time interval determined in known manner by the component values of the circuit. The normal output at Q is up during set condition of the circuit. An inverted output is also available at $\overline{Q}$. The time delay for circuit 132 is typically 50 ms. The Q output signal is tapped on line 111 for control of latches 110, which are therefore opened only for the duration of the 50 ms square wave indicated at B in FIG. 4.

The inverted B signal is supplied as input to the delay circuit 136, which is typically similar to circuit 132 but with a time delay of 20 ms. The Q output from circuit 136 is therefore as shown at C in FIG. 4. The inverse of that signal controls the AND gate 134, enabling that gate in absence of a C signal to transmit a Frame Address signal from line 150 to the line 117 for control of the twelve AND gates 116. The Frame Address signal is typically a 100 microsecond pulse generated 1,200 times per second by circuitry to be described in connection with FIG. 6. The first such pulse to arrive after termination of a C signal strobes to lines 118 and 119 the position and Bit 14 data that was stored in latches 110 at the start of that C signal.

Data Ready Signal

The direct output C from delay circuit 136 is differentiated by the capacitance 141, producing pulses of alternating polarity, which are inverted by the NOR gate 142. The diode 143 transmits to the line 145 only the positive pulses D, which coincide with the trailing edge of signals C. The other input to NOR gate 142 is a pulse-inhibit signal which is up, closing gate 142, whenever presence of a 0 vertical crossbar signal coincides with absence of a 1 vertical crossbar signal. Such a pulse-inhibit signal is derived typically by the NOR gate 144, connected as shown in FIG. 5. It causes gate 142 to block pulses corresponding to those TUR timing pulses which are utilized for shifting from one horizontal crossbar to the next, and which therefore do not involve closure of any crossbar switch contacts. Hence line 145 receives positive pulses D which follow by 70 ms only those TUR timing pulses which actually produce connection of a communication circuit to one of the busy condition detectors 50.

Positive pulses D on line 145 set the latch circuit 146, typically comprising a bistable flip-flop which, when set, produces an up signal on the output line 147. That signal is strobed to the line 151 via the AND gate 148 by a Frame Address signal from line 150, already described. The output on the line 151 is conveyed to FIG. 6 as a Data Ready signal for indicating presence and initiating processing of position signals at latches 110 from this particular TUR frame. Following processing of each set of such data, a reset signal is returned on the line 152, is gated by the Frame Address signal at AND gate 154, and resets latch 146. Another Data Ready signal then cannot be generated until the next TUR timing pulse. In the meantime, even if gates 116 pass data to lines 118 and 119, it is ignored by encoding unit 89 in absence of a Data Ready signal.

Supplementary Data Words

Provision is preferably made for encoding supplementary data in addition to that directly concerned with the busy condition of the communication lines being tested. Such supplementary data may take many forms, including checksum signals employed for checking the detector signals of the preceding scanning cycle, and the alarm signals on lines 84, already described. In accordance with a further aspect of the present invention, such supplementary data may be encoded as additional words during the otherwise idle time following each complete scan of the TUR crossbar switches, such additional words being generated in response to termination of a regular series of TUR timing pulses.

As illustratively shown in FIG. 5, termination of such a series is sensed by the circuitry 160, which then produces respective signals first on the line 167 and then on the line 169 for initiating production of two such words of additional data. Since the normal scanning cycle comprises 600 words per frame, numbered 0 to 599, those additional words are designated word 600 and word 601. Circuitry 160 comprises the two time delay circuits 162 and 164, which are typically similar to circuit 132, described above, but produce respective time delays that are appreciably longer and appreciably shorter than the time between successive TUR timing pulses A. Time delays of the order of 200 and 10 ms, respectively, are typical. Circuit 162 is set in response to each TUR timing pulse A, typically by the already delayed signal C from line 137. During a normal TUR scanning cycle, that setting action is repeated approximately every 145 ms, which is often enough to maintain circuit 162 continuously set, with its Q output up and $\overline{Q}$ down. The second time delay circuit 164 normally remains in reset condition with its $\overline{Q}$ output up. Under that normal condition the signal produced on line 167 by the NOR gate 166 and the signal produced on line 169 by the AND gate 168 are both down.

After completion of a TUR scanning cycle the timing pulses are interrupted, allowing delay circuit 162 to run out its time and become reset. The resulting positive step voltage at its $\overline{Q}$ output then sets circuit 164, bringing its $\overline{Q}$ output down. A positive Word 600 signal is thereby generated on line 167, and is utilized to initiate word 600. After 10 ms further delay, circuit 164 becomes reset, terminating the Word 600 signal and producing a positive Word 601 signal on line 169. After initiating word 601, the Word 601 signal is typically allowed to continue in effect until terminated by setting of delay circuit 162 in response to the first TUR timing signal of the next following scanning cycle. Further processing of the word 600 and word 601 data by the circuitry of FIG. 6 is initiated by generation of Data Ready signals on line 151. As shown in FIG. 5, at reset of each of the time delay circuits 162 and 164 the positive step signal from its $\overline{Q}$ output is differentiated by the associated capacitance 170 or 172, transmitting a positive pulse via the diode 171 or 173 to line 145, setting latch 146 and generating a Data Ready signal at the next Frame Address signal in the manner already described.

Detector Signals

The detector signals on the six lines 84 from the respective TUR busy detectors 50 are buffered by alternate ones of the buffering circuits indicated at 180. The other buffering circuits 180 similarly buffer supplementary signals supplied over the respective lines 85, which may typically comprise alarm signals developed at 86 of FIG. 1 as already described. The detector signal lines are paired with respective alarm signal lines, and either the detector signals or the alarm signals are gated to the six lines 185 by the detector AND gates 186 or the alarm AND gates 188. All alarm gates 188 are simultaneously enabled by an up signal on the line 189, which receives the Word 600 signal from line 167. All detector gates 186 are simultaneously enabled by an up signal on the line 187, which receives the inverted Word 600 signal from line 189 via the inverter 184. Hence all six lines 185 receive detector signals continuously except during word 600, and receive alarm signals only during word 600. Those detector/alarm signals are passed on to the lines 210, except during word 601, by the AND gates 206, which receive the inverted Word 601 signal from line 169 via the inverter 211 and further conditioned by the Frame Address signal at the AND gate 212. In effect, the detector/alarm signals are therefore strobed to lines 210 by the Frame Address signals, insuring their further processing in correct time relation to identify them with this particular TUR frame. Although the information is thus made available to encoding unit 89 at each Frame Address signal for this frame, it is ignored by the encoding unit unless the latter receives a Data Ready signal on line 151 from circuit 140.

Checksum Signal

In order to develop a checksum signal corresponding to the detector/alarm signals for each complete TUR scanning cycle plus the following word 600, the six detector/alarm lines 185 are tapped by the respective lines 192 for supply to the checksum circuit indicated schematically at 190. The signals on the six lines 192 are treated as a 6-bit binary number, and are fed as addend to the 6-bit full binary adder represented at 194. Adder 194, typically of conventional form, accepts two 6-bit binary numbers on the lines 192 and the lines 196, respectively, and produces on the six output lines 198 binary signals representing the first six significant digits of the sum of those binary numbers. Those six output signals are stored temporarily in the respective latch circuits represented at 200, which typically comprise bistable flip-flops with normally stable outputs on the respective lines 204 which are all resettable to logical zero by a Reset signal on the line 203. An Add Checksum signal in the form of a positive step voltage on the line 202 causes the flip-flop outputs to duplicate the then existing inputs. The output lines 204 are tapped by lines 198 to supply the latch output as augend to adder 194. Thus the latch output after a series of Add signals represents the cumulative sum, to the extent of the first six bits, of all addends that stood on the lines 192 during those Add signals.

An Add Checksum signal is supplied from circuitry to be described in FIG. 6 to the line 216 in response to processing of each word of data. Those signals are gated at the AND gate 218 by the Frame Address signal from line 150. Hence the checksum standing on lines 204 at each word 601 represents the sum for the preceding data words 0 to 599 plus the alarm word 600, all as actually processed. That binary checksum on lines 204 is gated to the lines 210 by the AND gates 208 in response to a Word 601 signal on the line 209. That signal is obtained from line 169 after gating at 214 by the Frame Address signal. After each checksum has been further processed as word 601 in FIG. 6, latch 200 is reset to zero by a Reset signal selected from the series of Reset signals that appear on line 152 after such processing of every word. Selection is made by gating the latter signals at AND gate 220 by the Frame Address signal and at AND gate 222 by the Word 601 signal.

Encoding Unit of FIG. 6

The eleven position signals supplied to FIG. 6 on lines 118 comprise binary coded decimal representations of the particular TUR switch and the particular crosspoint of that switch that are operated. Those signals are converted to straight binary code in BCD to Binary converter 230, which is typically of conventional form.

During words 600 and 601 it is desirable to alter that code in a distinctive manner. As illustratively shown, that is accomplished mainly by overriding the negative power input that is normally supplied to code converter 230 via the series resistance 233 and the line 234. The OR gate 235 receives as its two inputs the Word 600 signal from line 167 and the Word 601 signal from line 169. The gate supplies a positive output signal to line 234 during those words, effectively deleting the negative power supply and biasing all output lines from code converter 230 to the relatively positive level of ground potential, which represents a logical 1 signal.

Distinction is made between words 600 and 601 by variation of the code bit of least significance. Since that bit is not altered by BCD to Binary conversion, its value can be manipulated independently of converter 230. Thus, the input line for the bit of least significance is shown at 118*a*, separated from the other input lines 118 and entering the OR gate 237. The other gate input is the Word 601 signal from line 169. The gate output is supplied as one input to the AND gate 238, the other input being the inverted Word 600 signal obtained from line 167 via the inverter 239. The output from gate 238, which becomes the binary code bit of least significance on the line 232*a*, is then down during word 600, is up during word 601, and follows the signal on input line 118*a* at other times.

In summary, therefore, at word 600 all binary code lines 232 except the first are up, corresponding to the decimal number 1022; and at word 601 all lines are up, corresponding to 1023.

Digital Storage Buffer

The 20 bits of information carried by the ten position lines 232, the single Bit 14 line 119, the six detector/alarm/checksum lines 210 and the three lines 244, which are still to be described, are stored temporarily in parallel in the digital storage buffer indicated schematically at 240. Buffer 240 is of the First-In-First-Out type, with capacity for receiving typically 13 words of 20 bits each for parallel storage of each word in response to a Data In Clock pulse DIC received on the line 246, and for delivering the word successively, in the same order in which they were received, to the 20 parallel output lines 242 in response to respective Data Out Clock pulses DOC received over the line 247. Buffer 240 typically produces a Flag 1 signal on the line 248 whenever there is at least one word in storage, and a Flag 13 signal on the line 249 when all 13 storage registers are full. An ADIS (any data in storage) signal on the line 250 is provided to permit detection of a lock-up condition, which is indicated by different outputs on ADIS and Flag 1. The entire register must then be cleared by inserting a Clear signal on the line 251.

Buffer 240 typically comprises four commerically available integrated circuits, each having a 5-bit capacity, with their input and output control signals tied in parallel. The integrated circuits sold by Texas Instruments Incorporated under the designation TMS 4006 are particularly suitable for that purpose. It is noted, however, that utilization of such integrated circuits for buffer 240, as for other portions of the present system, may require inversion of some or all of their input and output signals, which have been assumed for clarity of description in the present specification to be positive-going signals.

Operation of digital storage buffer 240 is mainly controlled by the circuitry indicated generally at 270 in response to timing signals derived from the oscillator 254. The output frequency of oscillator 254 is typically 1,843.2 kHz, and is divided by 12 in the counting circuit 256 and further divided by 16 in the counting circuit 258, which produces three bits of binary code on the lines 259, of which the line 259*c* carries a square wave signal at 9,600 Hz. That signal is further divided by eight in counting circuit 260, with binary code output on the three lines 262, of which the line 262*c* carries a periodic signal at 1,200 Hz. The latter signal is gated and further divided for control of the code conversion of information recovered from storage buffer 240, as will be described below.

Frame Address Signals

The binary code signals just described on lines 262 are decoded in binary to decimal decoder 264, producing signals in sequence on the eight respective output lines 266 at the typical 1,200 Hz frequency. Those signals are employed as Frame Address signals for controlling the input of data from up to eight TUR frames via the circuitry shown illustratively for one frame in FIG. 5. Each TUR frame is thus addressed 1,200 times per second for roughly 100 microseconds each time. In the logic and control circuit 88 (FIG. 5) for its particular TUR frame, each Frame Address signal enables gate 148 to produce a Data Ready signal on line 151 if data ready latch 146 for that frame has been set since the last previous address; enables gates 134, 212 and 214 to make data available from that frame; enables gate 218 to transmit an Add Checksum signal to latch 200 of that frame; and enables gates 154 and 220 to transmit a Reset signal to data ready latch 146 and to checksum latch 200 of that frame.

The 3-bit binary code signals on lines 262 provide a code representation of the particular TUR frame that is being addressed at each instant. Those signals are supplied via the lines 244 to storage buffer 240 as three of the 20 bits of parallel input information to that buffer, as already indicated, and may be referred to as the TUR frame identification. For many purposes those three bits are conveniently grouped with the ten position signals on lines 232. The extra bit introduced on line 119 then becomes "Bit 14," as indicated above.

Control Circuit 270

The 3-bit binary code signals on lines 259 are decoded in binary to decimal decoder 272, which is typically similar to decoder 264, described above, with eight available output lines. Only four of these lines are used, typically selected as the fourth through the seventh. Those lines are pulsed in sequence 9,600 times per second, each series of pulses lying within a definite one of the Frame Address signals delivered by decoder 264. The four pulses of each series will be designated in sequence as $S_0$, $S_1$, $S_2$ and $S_3$, and appear on the respective lines indicated collectively at 274.

Circuit 270 includes three latch circuits, which are designated 0, 1 and 2 in the order of their operation. Each latch circuit is of a known type which responds to a clock pulse at its C input to latch input information supplied to a data input D, making that data continuously available at the latch output Q until the latch is reset by a reset signal at R.

Clocking of data into storage buffer 240 is initiated by a Data Ready signal on line 151, which is normally transmitted via the AND gate 282 to the D input of Latch 0. However, if buffer 240 is already full, the Flag 13 on line 249, inverted at 280, disables AND gate 282, blocking further action until a Data Ready signal appears while the Flag 13 is absent. The next $S_0$ timing pulse then latches the Data Ready signal and transfers it to the latch output. The resulting signal on the line 284 enables the AND gate 286 and also provides a clock pulse to latch 1, transferring the positive signal at its data terminal to its output to enable the AND gate 288. The following timing pulse $S_1$ is transmitted by AND gate 286 as a DIC signal to line 246, clocking into storage buffer 240 the data then standing on the parallel lines 232, 244, 119 and 210. Pulse $S_1$ also appears on line 216 as an Add Checksum signal.

Timing pulse $S_1$ also clocks into latch 2 any signal standing at its input D. That signal is a logical zero unless the Flag 1 and ADIS outputs from buffer 240 are different. In that case, which indicates lockup of the buffer, the exclusive OR gate 290 supplies to latch 2 a true signal which is transferred at pulse $S_1$ to the latch output, enabling AND gate 292. Under that abnormal condition the following timing pulse $S_2$ is transmitted by gate 292 to line 251, clearing all data from storage buffer 240 and terminating the lockup condition.

Returning to normal operation of the system, following loading a 20-bit word of data into buffer 240 in response to $S_1$, the next timing pulse $S_2$ is transmitted by AND gate 288 as a reset pulse to line 152, performing the reset functions already described in connection with FIG. 5, namely, to reset data ready latch 146 and checksum latch 200. The reset pulse from gate 288 also resets latch 0 of circuit 270, disabling gate 286 and preparing that latch for reception of a new Data Ready signal. The final timing pulse $S_3$ of the series resets latch 1, disabling gate 288. All of the described functions of control circuit 270 take place within a single Frame Address signal from decoder 264, and therefore affect only the logic and control circuit (FIG. 5) for the particular frame that is addressed.

Binary to Serial Convertion

The 20-bit binary coded words stored in parallel mode in buffer 240 are made available successively at the 20-fold output lines 242 in the same order in which they were stored and in response to respective DOC signals on line 247. As each word appears on lines 242 it is converted from parallel to serial code by the code converter 300, which may be of conventional form. The resulting serial code on the single output line 302 is typically amplified at 304 and is delivered via the line 306 to any desired conventional data processing center, indicated at 308.

Code converter 300 transfers to output line 302 the individual input bits of each word successively in a definite order in response to respective Bit Address signals supplied on the five lines 312 from the counting circuit 310. The latter circuit normally receives continuous periodic input pulses at the typical frequency of 1,200 Hz from the line 262*c* via the AND gate 314. Those pulses are divided by 24 in counter 310 to produce 5-bit binary coded Bit Address signals on lines 312. The Bit Address signals are decoded within converter 300 to identify successive input data bits for transfer to output line 302. Converter 300 may, for example, comprise three integrated circuits of the type manufactured by Texas Instruments Corporation under the designation SN74151, each adapted for transferring eight input bits successively from respective input lines to a common output line in response to a timing strobe and with bit selection by Bit Address signals supplied in 3-bit binary form. Three bits of the Bit Address signals on lines 312 are then supplied in parallel to all three integrated circuits, while the other two bits are decoded to supply strobe pulses to those circuits in sequence.

Such an arrangement utilizes 24 of the 1,200 Hz pulses from line 262*c* for converting each 20-bit word retrieved from buffer 240. In the present system, the 21st pulse of each series is employed to transmit a further bit of information, which thus becomes the 21st bit of each serially encoded word. The 22nd and 23rd pulses are utilized for control operations, and the 24th pulse forms an interval between successive serially coded words.

The information transmitted as the 21st bit of each word typically represents the parity of the precding 20 bits, and may be generated by the conventional parity generating circuit 316. Parity generator 316 receives each data bit from line 302 via the AND gate 319 under control of the 1,200 Hz pulses from line 262*c*, sums the logical 1 bits, and presents as output the digit of lleast significance of the resulting sum. The switch 318 permits selection of even or odd parity signal. That signal is made continuously available via the line 317 to the 21st input of code converter 300, but is transferred to the converter output only in response to a Bit Address signal for the 21st bit.

Control signals are generated at the 22nd and 23rd bits of each serially encoded word by the circuit 320, which decodes the binary coded Bit Address signals on lines 312. Since only two outputs are required from the decoder 320, it may typically comprise a conventional 16-bit binary decoder receiving as inputs only the first three and the fifth bits from lines 312. The signal from decoder 320 at the 22nd bit is supplied via the line 247 to digital storage buffer 240 as DOC signal to shift each stored word down by one register, making a new work available at output lines 242. The signal at the 23rd bit is supplied via the line 322 to parity generator 316 to reset its counting circuits to zero. The 23rd bit signal also has the effect of disabling gate 314 and thereby interrupting further operation of counter 310 and code converter 300 pending verification that data processing center 308 is ready to receive further data.

During normal data transmission, a Grant signal from data processing center 308 is continuously sent via the line 328 to the AND gate 330, enabling that gate. In absence of a bit 23 signal on line 322 gate 330 receives a positive signal from the inverter 332. It therefore normally transmits an enabling signal to AND gate 314 via the line 315. That signal is removed at the 23rd bit, disabling gate 314. The bit 23 signal is also transmitted via the AND gate 324 and the line 326 as a Request signal to data processing center 308, provided at least one word is stored in digital storage buffer 240 so that gate 324 receives an enabling Flag 1 signal from the buffer via line 248. If that Request signal is not answered by a Grant signal on the line 328, gate 314 remains disabled after termination of the 23rd bit signal. Hence transmission of data remains interrupted until reestablished by receipt of a Grant signal.

In summary of the overall time relations of the present illustrative system, each TUR frame typically scans its 600 crosspoints in about 95 seconds, or at an average rate of about 6.3 per sec. Eight frames thus produce data at an average rate of about 50 words per second. With words of 24 bits each, serial encoder 300 thus operates typically at a 1,200 baud rate, as has been described. Each TUR frame is typically controlled by independently generated timing pulses 61 from its own generator 62. It is therefore possible for timing pulses to occur simultaneously in different TUR frames, producing Data Ready signals at latches 146 of the logic and control circuits 88 (FIG. 5). Those signals are then held in their respective latches until storbed to the common encoding circuit 89 (FIG. 6) at respective 100 microsecond intervals by the next cycle of Frame Address signals produced by decoder 264. Each such Data Ready signal initiates a cycle of operation of storage buffer control circuit 270, entering the corresponding data in buffer 240. It is thus conceivable for buffer 240 to receive data from all eight frames within a single cycle of Frame Address signals, or about 0.8 ms. However, no further data would then become available for about 145 ms, the period between timing pulses.

If less than eight TUR frames are to be serviced, the encoder shown illustratively in FIGS. 5 and 6 can be employed without change, except that the number of digital and control circuits 88 (FIG. 5) can, of course, be correspondingly reduced. For use with only a single TUR frame, the system can be considerably simplified. For example, the described strobing actions of the Frame Address signals in the present system can be taken over by pulses derived via a time delay circuit from the TUR timing pulses. Moreover, the storage function of buffer 240 can then be greatly reduced or eliminated entirely, each data word being converted from parallel to serial code essentially as it occurs, and then released to data processor 308 via relatively simple interface circuitry of conventional type. The reduced volume of data from a single TUR frame permits a lower rate of data transmission, typically about 200 baud, with corresponding reduction in the transmission line quality that is required. Similarly, by providing in the system design for a data transmission rate higher than 1,200 baud, more then eight TUR frames can be effectively serviced by a system of the general type that has been described. The particulars of the present description and drawings are intended only as illustration, and not as a limitation upon the scope of the invention.

We claim:

1. In combination with electromechanical circuit scanning mechanism that includes a plurality of crossbar switches each having mutually transverse sets of crossbars with respective crossbar operating magnets and having at each crosspoint a plurality of levels of switch contact sets comprising respective input and output switch contacts closable in response to coincident operation of both crossbars at the crosspoint, scan control means for developing successive cycle of crossbar operating magnet pulses, each cycle including magnet pulses for operating the respective crossbars in such time relation as to close the contact sets at all crosspoints in sequence, switch control means for delivering the pulses of successive cycles to the corresponding crossbar operating magnets of the respective switches in sequence, means for coupling distinct communication circuits to the respective switch input contacts, and detector circuit means for each level coupled in multiple to the switch output contacts thereof for producing a busy signal in response to busy condition of a coupled communication circuit; encoding means comprising first circuit means coupled to the scan control means for deriving binary position signals identifying the crossbar with which each crossbar operating magnet pulse is associated, second circuit means coupled to the switch control means for deriving binary switch signals identifying the switch with which each operated crosspoint is associated, third circuit means coupled to the respective detector circuit means and responsive to the busy signals produced thereby, and code translating means for receiving the position signals, the switch signals and the busy signals associated with each operated crosspoint and for converting the same to a unitary set of binary code signals that identify the communication circuit corresponding to each received busy signal.

2. Encoding means according to claim 1, and wherein said scan control means produces crossbar operating magnet pulses in such time relation that the crossbars of one set are operated in ordered sequence and that the crossbars of the other set are operated in ordered sequence during said operation of each of the crossbars of said one set, said encoding means including gating means for supplying to the code translating means the position signals for each operated crossbar only after termination of the position signals for the previously operated crossbar of the same set.

3. Encoding means according to claim 1, wherein said scanning mechanism includes means for generating periodic timing pulses for time control of said scan control means, said encoding means including means for supplying the position signals and the busy signals to the code translating means in differential time relation to said timing pulses.

4. Encoding means according to claim 1, wherein said scanning mechanism includes means for generating periodic timing pulses, said scan control means developing each magnet pulse under time control of a timing pulse, said encoding means including means for latching the respective position signals at a first time interval following a timing pulse, and means for releasing the latched position signals for supply with the busy signals to the code translating means after a second time interval.

5. Encoding means according to claim 1, wherein said scanning mechanism includes means for generating a series of periodic timing pulses for time control of the generation of the magnet pulses of each cycle with interruption of the timing pulses between cycles, said encoding means including timing mechanism for sensing interruption of the periodic timing pulses, and means responsive to the timing mechanism for supplying to the code translating means binary code signals representing supplementary data in response to a sensed interruption of the timing pulses.

6. In combination with electromechanical circuit scanning mechanism that includes a plurality of frames of crossbar switches, each frame including a plurality of crossbar switches with respective mutually transverse sets of crossbars and with crossbar operating magnets and having at each crosspoint a plurality of levels of switch contact sets comprising respective input and output switch contacts closable in response to coincident operation of both crossbars at the crosspoint, scan control means for each frame for developing successive cycles of crossbar operating magnet pulses, each cycle including magnet pulses for operating the respective crossbars in such time relation as to close the contact sets at all crosspoints of a switch in sequence, switch control means for each frame for delivering the pulses of successive cycles to the corresponding crossbar operating magnets of the respective switches in sequence, means for coupling distinct communication circuits to the respective switch input contacts, and detection circuit means for each frame coupled in multiple to the switch output contacts of each level for producing a busy signal in response to busy condition of a coupled communication line: encoding means comprising first circuit means coupled to the scan control means for each frame for deriving binary position signals identifying each operated crossbar, second circuit means coupled to the switch control means for each frame for deriving binary switch signals identifying the switch with which each operated crosspoint is associated, means for receiving the busy signals for each operated crosspoint and the position signals and the switch signals associated therewith to form a signal set, means for developing frame signals identifying the frame with which the received signals of each set are associated, and code translating means for converting said received signals and frame signals to serial binary code signals that identify the communication circuit corresponding to each received busy signal.

7. Encoding means according to claim 1, wherein said code translating means include first means for converting said position signals, said switch signals and said busy signals to a unitary set of parallel binary code signals, digital storage buffer means for storing the parallel code signals, and second means for converting the stored parallel code signals to serial binary code signals.

8. Encoding means according to claim 6, wherein said code translating means include first means for converting said position signals, said switch signals and said busy signals to a unitary set of parallel binary code signals, digital storage buffer means for storing in parallel each said signal set and the frame signals associated therewith, and second means for converting the stored parallel code signals to serial binary code signals.

* * * * *